Patented Nov. 5, 1940

2,220,430

UNITED STATES PATENT OFFICE 2,220,430

CATALYTIC DEHYDRATION OF ALCOHOLS

Herbert Muggleton Stanley, Tadworth, England, assignor to The Distillers Company Limited, Edinburgh, Scotland, a Britsh company No Drawing. Application February 6, 1939, Serial No. 254,977. In Great Britain February 21, 1938

8 Claims. (Cl. 260—682)

This invention relates to catalytic dehydration reactions and has particular reference to the conversion of alcohols to olefines and to the reverse reaction i. e. the conversion of olefines to alcohols.

It is known that the alcohols can be dehydrated to the corresponding olefines by passage over catalysts such as phosphoric acid on coke at elevated temperatures.

It has been found that when catalysts consisting of or containing a phosphate are employed for the conversion of the alcohols to the corresponding olefines over long periods of use such catalysts tend to become less active possibly due to loss of phosphoric acid in the form of a volatile organic phosphate. This decrease in activity is more particularly noticeable at high temperatures.

According to the present invention the dehydration of alcohols with the aid of catalysts consisting of or containing phosphoric acid or a phosphate or mixture of phosphates is carried out in the presence of a volatile phosphoric acid ester. Particularly suitable esters are the esters of the lower alkyl alcohols such as ethyl, propyl and butyl phosphates.

The said phosphoric acid esters may be added intermittently or continuously to the compounds undergoing the conversion. The amount of ester required is of the order of 0.01 to 0.2%. For example in the production of ethylene from ethyl alcohol the alcohol vapour may be passed over the catalyst carrying with it continuously a small amount, e. g. 0.1% of triethyl phosphate. In the production of higher olefine such as propylene, butylene and the like, the amount of volatile phosphate may be less; e. g. 0.025% is a suitable amount for propylene.

The amount of phosphoric acid ester actually used depends on the operating conditions, notably the composition of the catalyst and the temperature of operation. In any case, in order to assure the maintenance of constant catalytic activity over prolonged periods of working the amount of ester used should be sufficient to compensate for the phosphoric acid (both free and combined) apparently lost from the catalyst mass i. e. the amount of ester fed to the reactor should be sufficient to maintain a phosphorus balance, the amount of phosphoric acid apparently lost in any form whatsoever being quantitatively compensated by the phosphoric acid fed in as volatile ester. In these circumstances, the catalyst will maintain a constant and uniform activity over very long periods of time, amounting to months or even years.

The rate of apparent phosphorus loss from phosphate catalysts during dehydration reactions depends on several factors. Under comparable conditions the acid loss is greater when dehydrating ethanol than when dehydrating isopropanol. In general, moreover, conditions which increase the rate of dehydration and raise the possible throughput, namely increase in temperature and acidity of the catalyst mass, tend to increase the apparent phosphorus loss per unit of alcohol decomposed.

Thus, by operating a catalyst at high temperatures, a higher output of olefines in unit time and per unit of catalyst volume is possible than at lower temperatures, but the phosphoric acid loss will be higher.

For reasons of phosphate economy it is preferable to operate under such conditions that a phosphorus balance is established when using 0.1%–0.2% of phosphoric acid triesters in the feed liquids.

I find that the volatile tri-esters of phosphoric acid are of no practical value as homogeneous catalysts for the dehydration of alcohols in the vapour phase, i. e. in the absence of solid or granular phosphate catalysts. Thus by passage of a vapourised mixture of 70% ethanol, 0.5% of triethyl phosphate (or 0.5% of tri-n-butyl or tri-isopropyl phosphates) and a residue of water through a reactor tube of $\frac{5}{16}$" bore and 160 cc. capacity at a feed rate of 100 grams per hour, practically no ethylene was formed even at temperatures as high as 500° C., while the alcohol was recovered substantially unchanged.

The following are four examples of carrying the invention into practical effect:

Example 1

3.6 litres of a catalyst prepared by impregnating ½" wood charcoal granules with a hot solution of 1000 grams of manganese carbonate in 1400 cc. of 90% phosphoric acid and 3000 cc. of water followed by drying at 200°–250° C., were charged into a single stage tubular reactor of 3" internal diameter, heated in an electric furnace. The catalyst was heated to a mean temperature of 260° C. (measured by a thermocouple located in the centre of the mass) and a vapourised mixture of 70% ethanol, 0.1% triethyl phosphate, 0.1% tri-n-butyl phosphate and a residue of water was passed over the catalyst at a rate of 250 grams per hour; ethylene was formed in a yield of 98% of the theoretical based on the alcohol used.

Example 2

A similar catalyst to that used in Example 1 was charged into a 4-stage dehydrating unit consisting of 4 vertical reactor tubes in series each 3 inches in diameter and 12 ins. in length connected by interstage preheating coils. The preferred arrangement is one in which the members of a set of tubular coils or the like alternate with the members of a set of dehydrating catalyst tubes or chambers, the said tubes or chambers themselves not being heated by applied heat, and the temperature being controlled by regulated heat applied to the several coils. The vapours passed through each pre-heating coil into the bottom of the corresponding reactor and thence through the catalyst bed into the next pre-heating coil and into the bottom of the next reactor. The gases leaving the fourth reactor were cooled to condense water and unchanged alcohol. Each reactor accommodated 1 litre of catalyst granules and temperatures were measured in each reactor at a point near the bottom of the catalyst bed. A mixture of 70% ethanol, 0.1% tri-n-butyl phosphate and a residue of water was vapourised and passed through this 4-stage reaction system at a rate of 350 grams per hour, the temperature of the catalyst bed in each reactor (measured at the bottom) being maintained steady at 275°–280° C. Under these conditions, ethylene was initially produced at a rate of approximately 120 litres per hour and in a yield of 96% calculated on the ethanol fed in, of which about 98% was decomposed per passage. The catalyst slightly increased in activity during a run lasting 600 hours.

Example 3

Ethylene production was carried out in a semi-technical 5-stage unit (with interstage preheating) over a catalyst similar to that used in Examples 1 and 2. The feed liquid consisted of a mixture of 70% by weight of ethanol, 0.1% of tri-n-butyl phosphate and a residue of water, and the temperatures and rates of flow were analogous to those employed in Example 2. After 5 months continuous operation the activity of the catalyst was quite undiminished and ethylene was produced at the same rate and efficiency as at the commencement of the run.

Example 4

91% aqueous isopropyl alcohol containing 0.025% triethylphosphate was vapourised at the rate of 1.2 gallons per hour, preheated to 250° C. and passed through a catalyst bed containing 22 litres of the catalyst used in previous examples. The mean catalyst temperature was about 200°–220° C. and the condensate (representing about 40% of the feed) contained only 0.75% of unchanged isopropyl alcohol and 0.15% of acetone the residue being water resulting from the dehydration and that contained originally. This catalyst was used without interruption for several months without diminution in activity.

One important advantage of ethylene produced in accordance with the present invention is that it has an exceptionally high degree of purity, such as is required for anaesthetic purposes.

What I claim is:

1. The method of producing olefines by the catalytic dehydration of alcohols while maintaining the catalyst activity, which comprises passing a mixture of the vapors of the corresponding alcohol and a volatile phosphoric acid ester into intimate contact with a heated mass of a dehydrating phosphate catalyst.

2. The method according to claim 1 in which the amount of volatile phosphoric acid ester used ranges from 0.01 per cent to 0.2 per cent.

3. The method according to claim 1 in which the alcohol used is ethyl alcohol and the amount of volatile phosphoric acid ester used ranges from 0.1 to 0.2 per cent.

4. The method according to claim 1 in which the alcohol used is a lower aliphatic alcohol containing more than two carbon atoms and the amount of volatile phosphoric acid ester used is of the order of 0.025 per cent.

5. The method of producing olefines by the catalytic dehydration of alcohols, while maintaining the catalyst activity, which comprises passing a mixture of the vapours of the alcohol and a volatile phosphoric acid ester into intimate contact with a heated mass of a dehydrating catalyst composed of a substance taken from the group consisting of phosphates and phosphoric acid.

6. The method of producing olefines by the catalytic dehydration of alcohols, while maintaining the catalyst activity, which comprises passing a mixture of the vapours of the alcohol and a volatile phosphoric acid ester into intimate contact with a heated mass of a dehydrating catalyst composed of a complex of substances taken from the group consisting of phosphates and phosphoric acid.

7. A method according to claim 1 wherein the volatile phosphoric ester is a trialkyl-phosphate.

8. In the process of dehydrating alcohols to form olefines by passing the vapor of the alcohol over a phosphate catalyst, the step of maintaining the catalyst activity by adding to the alcohol vapors from about 0.01% to about 0.2% of a volatile phosphoric acid ester to replace the phosphate radicle driven off from the phosphate catalyst during use.

HERBERT MUGGLETON STANLEY.